United States Patent [19]

Sylvester et al.

[11] Patent Number: 5,201,201
[45] Date of Patent: Apr. 13, 1993

[54] LOCKABLE SEALER FOR END OF THREADED PIPE

[76] Inventors: William C. Sylvester, 136 Old Country Rd., Crockett, Calif. 94525; Douglas C. Gillette, 1315 7th St., Rodeo, Calif. 94572

[21] Appl. No.: 882,286

[22] Filed: May 13, 1992

[51] Int. Cl.⁵ .............................................. B65D 55/14
[52] U.S. Cl. ........................................ 70/165; 70/175; 70/232; 137/382
[58] Field of Search ................. 70/164, 165, 232, 177, 70/175, 178, 180, 231, DIG. 57; 138/381, 382

[56] References Cited

U.S. PATENT DOCUMENTS

| | | | |
|---|---|---|---|
| 1,599,685 | 9/1926 | Spaeth | 70/164 |
| 1,636,641 | 7/1927 | Lewis | 70/165 |
| 1,760,977 | 6/1930 | Duffy | 70/232 |
| 3,477,607 | 11/1969 | Fuzzell et al. | 70/165 |
| 4,516,414 | 5/1985 | Woolvin | 70/164 |
| 4,803,858 | 2/1989 | Parker | 70/232 X |
| 4,959,980 | 10/1990 | Phillips | 70/164 X |
| 5,027,626 | 7/1991 | Appelbaum | 70/165 X |

FOREIGN PATENT DOCUMENTS 86945   1/1922   Austria ........................... 70/165

Primary Examiner—Lloyd A. Gall
Attorney, Agent, or Firm—David Pressman

[57] ABSTRACT

A waterlock comprises a threaded cap nut (11) which fits tightly over the threaded end of a water pipe (15) or faucet (21). A sleeve (10) fits over the cap nut to prevent access to the nut. The sleeve is free to rotate about the cap nut such that turning the sleeve will not turn the nut. The nut has a flat end with a central hole (16), while the sleeve also has a flat end with a central hole (14). A stem (12) with a flange (17) at its base extends outwardly through the holes. The flange secures the stem to the nut by engaging the inside of the nut. An orthogonal hole (18) in the stem accepts a padlock (20) which prevents the sleeve from being removed from the cap nut.

8 Claims, 2 Drawing Sheets

LOCKABLE SEALER FOR END OF THREADED PIPE

BACKGROUND

1. Field of Invention

This invention relates generally to security devices for preventing unauthorized access to liquid or gas supplies, specifically to an improved lock for water pipes and faucets.

2. Prior Art

Purified fresh water is one of the most valuable natural resources. This fact is most evident in the many parts of the world which suffer from long and recurring droughts. In the United States, local governments in drought-stricken areas impose water rationing on their citizens, who incur penalties if the ration is exceeded. However, people's desire to maintain water thirsty landscaping and clean cars have caused some to ignore such rationing. Some people have been known to steal thousands of gallons of their neighbors' water by tapping into their outdoor water supplies. Other publicly accessible water supplies, such as water faucets in parks and recreation areas, are vulnerable to wasteful use by dishonest people. On hot, dry summer days, fire hydrants are often illegally opened to create miniature "water parks" for the neighborhood, wasting water at hundreds of gallons a minute.

Some attempts have been made to curb unauthorized access to outdoor water supplies. Many water pipes and faucets in public parks have locked wire cages built around them. Although effective, these cages are somewhat complicated and difficult to install. U.S. Pat. No. 4,516,414 to Woolvin (1985) shows a locking device for water faucets. It uses a locked clamp to encompass the handle of a faucet, and link arms to secure a cap in place over the nozzle of the faucet. However, it is even more complicated and difficult to use.

OBJECTS AND ADVANTAGES

Accordingly, several objects and advantages of the invention are to provide a waterlock for outdoor water pipes and faucets which will prevent unauthorized release of water, which fits most types of outdoor water outlets without modification, which is durable, which is very simple in construction, which is very easy to install, which may be removed by authorized persons with ease, which is very economical to manufacture, and which may be easily adapted for locking other types of outlets such as fire hydrants, fuel pipes, chemical pipes, gas pipes, etc.

Further objects and advantages will become apparent from a study of the following description and the accompanying drawings.

SUMMARY

In accordance with the present invention, we provide a device for lockably sealing the threaded end of a pipe, e.g., of an outdoor cock. The device comprises a gasket which can be pressed against the end of the pipe to seal same, a stem having a flange on its proximal end for urging the gasket against the end of the pipe, and a cap nut for threaded engagement with the threads of the pipe for urging the flanged stem, and hence the gasket, against the end of the pipe. The distal end of the flanged stem extends through a hole in the end of the cap nut and has a locking hole extending orthogonally through such distal end. A sleeve covers the cap nut and has an end with a hole therethrough so that the flanged stem also protrudes through the hole. The sleeve is free to rotate with respect to the cap nut and thus prevents one from loosening the cap nut with a wrench. The shackle of a lock is passed through the locking hole in the flanged stem to prevent removal of the sleeve, thereby preventing removal of the cap nut unless the lock is unlocked and its shackle is removed from the stem.

DRAWING FIGURES

DRAWING REFERENCE NUMERALS

| | |
|---|---|
| 10. Sleeve | 11. Cap Nut |
| 12. Stem | 13. Gasket |
| 14. Hole | 15. Water Pipe |
| 16. Hole | 17. Flange |
| 18. Hole | 19. Cut |
| 20. Padlock | 21. Faucet |
| 22. Large Sleeve | 23. Fire Hydrant |

DESCRIPTION—FIG. 1

Figure 1:
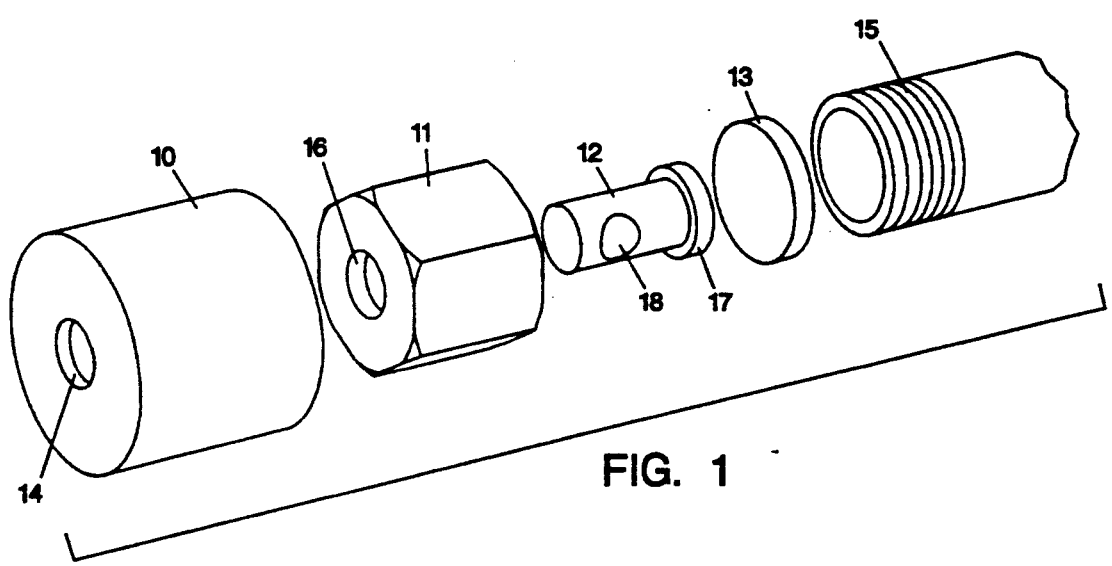
FIG. 1 is an exploded perspective view of a waterlock in accordance with the invention.
Figure 2:
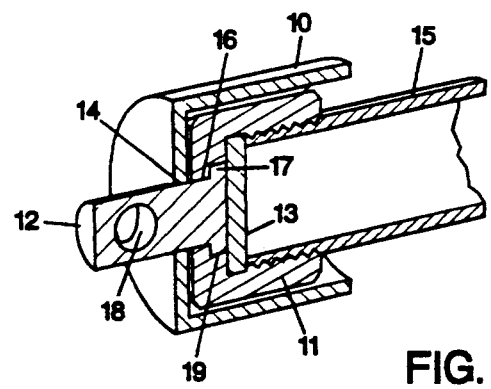
FIG. 2 is a sectional perspective view of the assembled waterlock.
Figure 4:
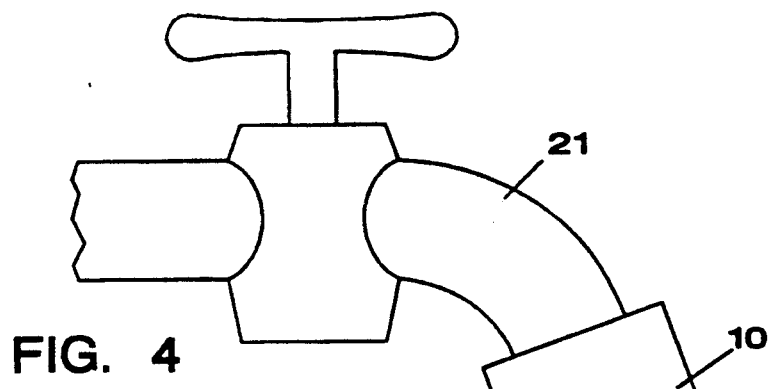
FIG. 4 is a side view of the waterlock in use on a faucet.
Figure 3:
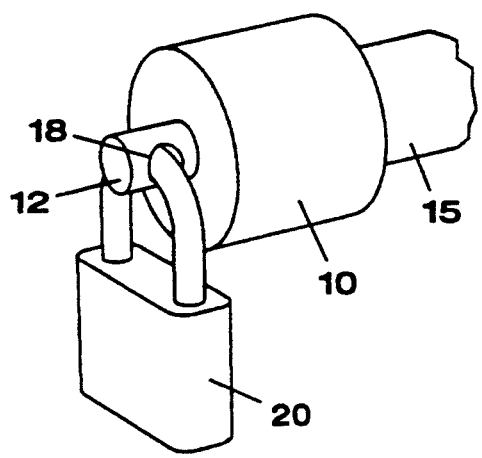
FIG. 3 is a perspective view of the waterlock in use on a water pipe.
Figure 5:
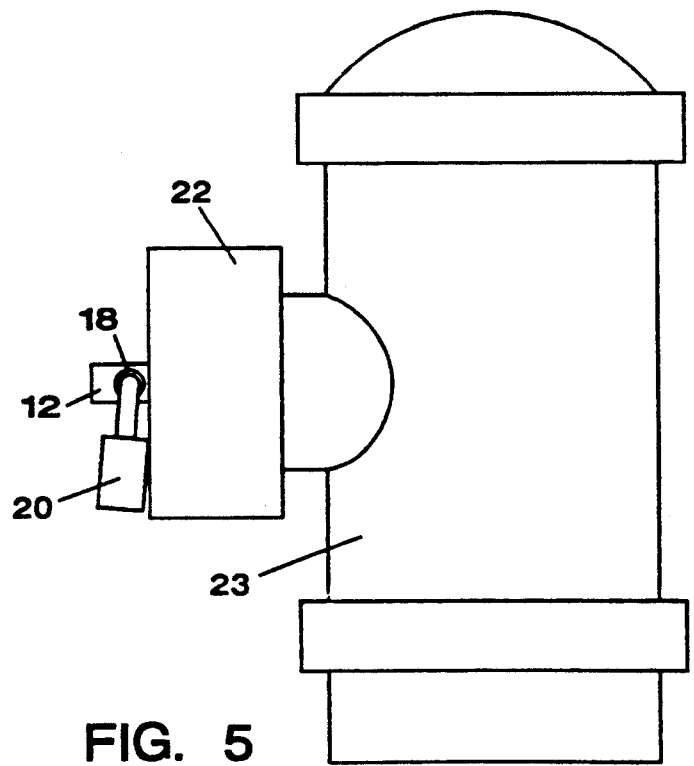
FIG. 5 is a side view of another embodiment of the waterlock in use on a fire hydrant.

In accordance with a preferred embodiment of the invention shown in the exploded view in FIG. 1, a very simple waterlock has a sleeve 10, a cap nut 11, a stem 12, and a gasket 13.

Sleeve 10 is a round cap with a hole 14 in the center of its flat end. Cap nut 11 has standard internal threads (not shown) which fit over the external threads of a standard outdoor water pipe 15. Cap nut 11 has a hole 16 in the center of its flat end. Stem 12 is a short rod with a flange 17 at its proximal end, and a hole 18 which extends orthogonally through the axis of the stem at its distal end. Rubber gasket 13 is of standard size and is commonly available. All parts, except gasket 13, are made of heavy brass or stainless steel for corrosion and tamper resistance.

DESCRIPTION—FIG. 2

Here the assembled waterlock is shown in a sectional perspective view. Cap nut 11 is threaded tightly onto pipe 15, while gasket 13 is compressed between the distal end of pipe 15 and the inside of cap nut 11 and flange 17 to provide a watertight seal. Sleeve 10 is positioned over cap nut 11 such that all of cap nut 11 is covered by sleeve 10. Sleeve 10 is free to rotate axially about cap nut 11. The inside rim of hole 16 in cap nut 11 has a widened portion 19. Flange 17 of stem 12 is seated in widened portion 19 such that the base of stem 12 is flush with the inside of the end cap nut 11. Stem 12 extends through hole 16 of cap nut 11 and hole 14 of sleeve 10 such that hole 18 of stem 12 is external of sleeve 10. Stem 12 is free to rotate axially within cap nut 11. Gasket 13 provides watertight seals between cap nut 11 and pipe 15, and also between cap nut 11 and stem 12.

The waterlock can be very easily installed. First, stem 12 is inserted through hole 16 of cap nut 11, and gasket 13 is seated into cap nut 11. Cap nut 11 is then wrenched tight onto water pipe 15. Sleeve 10 is then placed over cap nut 11, whereafter a locking device is finally be placed through hole 18 of stem 12, as will be shown in the following figures.

DESCRIPTION—FIG. 3

Here the waterlock is shown installed on a standard water pipe 15; the shackle of a padlock 20 is installed through hole 18 of stem 12. Since sleeve 10 covers cap nut 11 (not shown), that a wrench cannot come in contact with cap nut 11. Because sleeve 10 and stem 12 are free to rotate axially about and with respect to cap nut 11, turning sleeve 10 or stem 12 will not loosen cap nut 11. Padlock 20 prevents sleeve 10 from being removed. The heavy duty metal components will effectively resist attempts to defeat or destroy the waterlock.

Authorized persons with the key to padlock 20 can easily remove the waterlock by first unlocking padlock 20, sliding off sleeve 10 to expose cap nut 11, then wrenching off cap nut 11.

DESCRIPTION—FIG. 4

Here the waterlock is installed onto the threaded nozzle (not shown) of an outdoor faucet 21. Because outdoor water faucets have standardized external threads around their nozzles, the waterlock can be used on virtually all types of outdoor water faucets.

DESCRIPTION—FIG. 5

The waterlock is shown installed on a fire hydrant 23. The size of stem 12 may remain the same, but the rest of the components are simply scaled up to fit the large pipes and threads of fire hydrants. The sleeve has been greatly enlarged to become large sleeve 22, while the cap nut (not shown) and the gasket (not shown) are similarly enlarged.

The waterlock may be easily adapted for use on other types of pipes and outlets by simply varying the size of its components and the type of threads used on cap nut 11.

SUMMARY, RAMIFICATIONS, AND SCOPE

Accordingly the reader will see that I have provided an improved waterlock which effectively prevents unauthorized access to water in outdoor pipes and faucets. It is very simple in design and therefore very simple to manufacture. Its materials will resist corrosion even after prolonged exposure to the elements. It is strong enough to resist attempts to defeat or destroy it. It is very easy to remove by authorized persons with the key to padlock 20. It fits most types of outdoor water outlets without modification. It may be easily adapted to fit other types of pipes and outlets such as fire hydrants, fuel valves, chemical valves, gas pipes, etc.

While the above descriptions are specific, they should not be considered as limitations on the scope of the invention, but only as examples of the preferred embodiment. Many other ramifications and variations are possible within the teachings of the invention. For example, the components may be made of different materials such as plastic. Stem 12 may be made as an integral part of cap nut 11. Stem 12 may be of different shapes. Cap nut 11 may have external threads to fit pipes and faucets with internal threads. Padlock 20 may be replaced with a combination lock.

Thus the reader is requested to determine the scope of the invention by the appended claims and their legal equivalents, and not by the examples given.

I claim:

1. A device for lockably sealing a threaded end of a pipe of a predetermined size for preventing any unauthorized person from drawing liquid from said end of said pipe, comprising:

a resilient gasket for providing a fluid-tight seal over said end of said pipe, a stem having a shaft with an axis and proximal and distal ends, a flange extending from said proximal end of said shaft in a direction generally orthogonal to said axis of said shaft, said flange being sized to engage and to urge said gasket against said end of said pipe so that said gasket will seal said end of said pipe when said flange is urged against said gasket, said distal end of said shaft including locking means for enabling said distal end of said shaft to be lockably enlarged for preventing passage of said distal end through a hole which is not greater than a predetermined size, a threaded cap nut for engagement with said end of said pipe, said threaded cap nut comprising a cylindrical portion and an end extending across said cylindrical portion, said end having a hole therethrough, said cylindrical portion being threaded for mating with said threaded end of said pipe, said cap nut being turnable by engaging a side surface of said cylindrical portion, said cap nut being sized to urge said gasket against said end of said pipe when said cap nut is tightened so as to cause said gasket to seal said end of said pipe, a sleeve comprising a cylindrical portion and an end extending across said cylindrical portion, said end having a hole therethrough which is not greater than said predetermined size, said sleeve being sized to cover said cap nut for preventing access to said side surface of said cylindrical portion of said cap nut so as to prevent anyone from turning said cap nut when said sleeve covers said cap nut, said sleeve being free to rotate about said cap nut, whereby when said gasket is placed against said end of said pipe, said flange is placed against said gasket, said cap nut is threadedly tightened to said threaded end of said pipe to urge said gasket against said end of said pipe, said sleeve is placed over said cap nut, said shaft of said stem extends through said holes in said end of said cap nut and said sleeve, and said distal end of said shaft is lockably enlarged so that said sleeve cannot be removed from said shaft, said gasket will seal said pipe so that one cannot draw fluid from said pipe, but when said distal end of said shaft is unlocked so that said sleeve can be removed therefrom, said cap nut and said stem can be removed so that one can draw fluid from said pipe.

2. The device of claim 1 wherein said locking means comprises a hole which extends orthogonally through said shaft of said stem.

3. The device of claim 2, further including a lock having a shackle which can be inserted through said hole in said shaft of said stem.

4. The device of claim 1 wherein said side surface of said cylindrical portion of said cap nut comprises a plurality of flat surfaces for engagement by a wrench.

5. The device of claim 1 wherein said cylindrical portion of said cap nut is threaded on an inside surface thereof.

6. The device of claim 1 wherein said side surface of said cylindrical portion of said cap nut comprises a plurality of flat surfaces for engagement by a wrench, and wherein said cylindrical portion of said cap nut is threaded on an inside surface thereof.

7. The device of claim 6 wherein said locking means comprises a hole which extends orthogonally through said shaft of said stem.

8. The device of claim 7, further including a lock having a shackle which can be inserted through said hole in said shaft of said stem.

* * * * *